US012553606B2

(12) United States Patent
Deuker et al.

(10) Patent No.: US 12,553,606 B2
(45) Date of Patent: Feb. 17, 2026

(54) METHOD FOR CONTROLLING A COMBUSTION DEVICE

(71) Applicant: Siemens Energy Global GmbH & Co. KG, Bayern (DE)

(72) Inventors: Eberhard Deuker, Mulheim an der Ruhr (DE); Benedict Kriegler, Mülheim a. d. Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 778 days.

(21) Appl. No.: 17/792,049

(22) PCT Filed: Oct. 16, 2020

(86) PCT No.: PCT/EP2020/079142
§ 371 (c)(1),
(2) Date: Jul. 11, 2022

(87) PCT Pub. No.: WO2021/164897
PCT Pub. Date: Aug. 26, 2021

(65) Prior Publication Data
US 2023/0046593 A1 Feb. 16, 2023

(30) Foreign Application Priority Data

Feb. 17, 2020 (EP) .................................... 20157640

(51) Int. Cl.
*F23N 1/00* (2006.01)
(52) U.S. Cl.
CPC ........ *F23N 1/002* (2013.01); *F05D 2270/082* (2013.01); *F05D 2270/0831* (2013.01);
(Continued)

(58) Field of Classification Search
CPC ....... F05D 2270/082; F05D 2270/0831; F05D 2270/305; F05D 2270/306;
(Continued)

(56) References Cited

U.S. PATENT DOCUMENTS

| 4,735,052 | A | 4/1988 | Maeda et al. | |
|---|---|---|---|---|
| 2009/0056413 | A1* | 3/2009 | Rao | F02C 9/28 73/23.31 |

(Continued)

FOREIGN PATENT DOCUMENTS

| CN | 101040148 A | 9/2007 |
|---|---|---|
| CN | 101166935 A | 4/2008 |

(Continued)

OTHER PUBLICATIONS

WO-2013061301-A1—Translation (Year: 2013).*
(Continued)

*Primary Examiner* — Steven B Mcallister
*Assistant Examiner* — Benjamin W Johnson
(74) *Attorney, Agent, or Firm* — Wolter Van Dyke Davis, PLLC

(57) ABSTRACT

A method for controlling a combustion process in a gas turbine wherein a combustion chamber, a control device storing a calculation model of the combustion process, and an exhaust air measurement device are used. A permissible limit value for nitrogen oxides and for carbon monoxide as pollutants is set. The actual value of at least one of the two pollutants is measured continuously in the exhaust air. When a signal to reduce the power of the gas turbine to a lowest possible value is given, then a minimum fuel supply at which the limit values are complied with is calculated. The fuel supply is then reduced either until the calculated mini- (Continued)

mum fuel supply is reached or until the continuously measured proportion of the pollutant reaches the permissible limit value.

19 Claims, 2 Drawing Sheets

(52) U.S. Cl.
CPC .. *F05D 2270/305* (2013.01); *F05D 2270/306* (2013.01); *F05D 2270/311* (2013.01); *F05D 2270/313* (2013.01); *F05D 2270/71* (2013.01); *F23N 2241/20* (2020.01); *F23N 2900/05001* (2013.01); *F23N 2900/05003* (2013.01)

(58) Field of Classification Search
CPC ......... F05D 2270/311; F05D 2270/313; F05D 2270/71; F23N 1/002; F23N 2241/20; F23N 2900/05001; F23N 2900/05003
USPC .......................................................... 431/76
See application file for complete search history.

(56) References Cited

U.S. PATENT DOCUMENTS

| | | | |
|---|---|---|---|
| 2009/0120054 A1 | 5/2009 | Prade | |
| 2009/0301097 A1 | 12/2009 | Deuker | |
| 2010/0050652 A1* | 3/2010 | Skipper | F23R 3/286 60/772 |
| 2011/0265487 A1 | 11/2011 | Gauthier et al. | |
| 2013/0158731 A1* | 6/2013 | Chandler | F23N 5/242 700/287 |
| 2016/0010566 A1 | 1/2016 | Bottcher | |
| 2016/0169518 A1* | 6/2016 | Davis, Jr. | F23N 5/003 60/765 |

FOREIGN PATENT DOCUMENTS

| | | | | |
|---|---|---|---|---|
| CN | 104011348 A | 8/2014 | | |
| CN | 105074169 A | 11/2015 | | |
| EP | 1533569 A1 | 5/2005 | | |
| EP | 3130852 A1 * | 2/2017 | ............. | F23N 5/003 |
| WO | WO-2013061301 A1 * | 5/2013 | ................ | F02C 9/28 |
| WO | WO-2015177339 A1 * | 11/2015 | ............. | B01D 53/56 |

OTHER PUBLICATIONS

EP 3130852 A1—Translation (Year: 2017).*
WO 2015177339 A1—Translation (Year: 2015).*
PCT International Search Report and Written Opinion of International Searching Authority mailed Apr. 2, 2021 corresponding to PCT International Application No. PCT/EP2020/079142 filed Oct. 16, 2020.

* cited by examiner

METHOD FOR CONTROLLING A COMBUSTION DEVICE

CROSS REFERENCE TO RELATED APPLICATIONS

This application is the US National Stage of International Application No. PCT/EP2020/079142 filed 16 Oct. 2020, and claims the benefit thereof. The International Application claims the benefit of European Application No. EP20157640 filed 17 Feb. 2020. All of the applications are incorporated by reference herein in their entirety.

FIELD OF INVENTION

The invention relates to a method for controlling a combustion device, the achievement of a minimum power being the primary concern.

BACKGROUND OF INVENTION

The prior art discloses a wide range of methods for controlling a combustion device. These are as a rule adapted to the respective combustion device and differ according to the type of combustion device and its purpose. In the present case, however, consideration is given to the state in which the combustion device can be operated with the lowest possible power in the permissible range. In this respect, it is known from the prior art that, in the partial load range, the relative content of pollutants, in particular the carbon monoxide load, increases with increasing distance from the rated power. Thus, taking into account the requirements for the content of pollutants, the operation of the combustion device is limited to a minimum value at which the limit values are reliably complied with.

It is customary in the prior art to use calculations and laboratory tests to determine the proportion of particular pollutants as the power decreases. Thus, when creating the rules for controlling the combustion process, the previously determined minimum power is set as the minimum value.

WO201361301A1 discloses a gas turbine plant involving a method in which the proportion of carbon monoxide is detected. In this case, the gas turbine plant comprises a gas turbine with a combustion chamber in which fuel is burnt during operation of the gas turbine. Here, the supply of fuel is controlled by a control device on the basis of a power reference value. Furthermore, a detection module is present, by means of which the carbon monoxide concentration can be determined. In this case, the power reference value is adapted in the control device as a function of the carbon monoxide concentration.

However, it is sometimes desirable for the combustion device to be operated with the lowest possible power, in particular in order to avoid a stoppage.

SUMMARY OF INVENTION

It is therefore an object of the present invention to make possible a lower power than hitherto customary at which the given limit values for the pollutants are complied with.

The object set is achieved by a method according to the invention. Advantageous method steps are indicated in dependent claims.

The method of the type in question is used to control a combustion process of a combustion device. What kind of combustion device is involved here is irrelevant in the first instance. At the least, the method can advantageously be used to control the combustion process in a combustion chamber of a gas turbine. In all cases, it is necessary for the combustion device to comprise at least one combustion chamber and for at least one burner to be arranged on this combustion chamber. By means of the burner, the fuel and the supply air required for combustion of the fuel can be delivered into the combustion chamber for combustion. Furthermore, a control device for carrying out the method is provided. For this purpose, a calculation model of the combustion process is stored in the control device. Here, at a predetermined power level, it can be determined on the basis of the stored calculation model whether the pollutants are theoretically within a permissible range.

For this purpose, it is necessary for a permissible limit value for the proportion of nitrogen oxides to be stored in the calculation model of the control device. Furthermore, it is similarly necessary to set a permissible limit value for the proportion of carbon monoxide. These two values can be defined as invariable quantities, or provision can be made for adaptation to local conditions to be possible. For example, the permissible limit values may be statutory requirements.

Since there is no realistic possibility of exact, completely error-free calculation on account of the large number of possible influencing factors, e.g. ambient conditions, and of completely constant combustion in the combustion device, e.g. on account of operating fluctuations, it is necessary to take account of a tolerance, and therefore a respective target value is arrived at on the basis of the permissible limit value for the respective proportions of nitrogen oxides and carbon monoxide. If a state is determined in which the target value for a pollutant is present, it can be reliably assumed that the permissible limit value has not been exceeded.

In order to be able to control the combustion process in an optimum manner, it is furthermore particularly advantageous if the type and/or quality of the fuel used is known. For this purpose, it is possible, on the one hand, for the relevant parameters to be entered as specified values in the control device. As an alternative, provision can be made for the type or quality of the fuel to be measured or determined before it is fed to the combustion device, and for the result to be transmitted to the control device.

For the present method as part of the control of the combustion device, a signal for setting a minimum power is furthermore necessary, thus ensuring that the fuel supply to the combustion device is subsequently reduced.

In order to achieve the lowest possible power, provision is now made according to the invention for the combustion device to have an exhaust air measurement device, by means of which at least the actual proportion of a relevant pollutant in the exhaust air can be detected.

With the now known actual component of one pollutant, the power of the combustion device can be further reduced until the target value is reached, provided that it is ensured that other limit values are reliably complied with.

While, in the prior art, due to the unknown level of the actually occurring pollutant load, a sufficient safety margin relative to actual compliance with the limit values must be taken into account when calculating the minimum possible fuel supply or the resulting power, and thus a large tolerance between the permissible limit value and the target value is necessary, a further power reduction with a reduction in the tolerance is in contrast possible by virtue of the process control according to the invention.

If the relevant pollutants—carbon monoxide and nitrogen oxides—are now considered, three different methods according to the invention for achieving the lowest possible power emerge.

In a first method according to the invention, the actual proportion of nitrogen oxides in the exhaust air is continuously measured. On the basis of the known actual proportion of nitrogen oxides, it is now calculated in the control device, on the basis of the calculation model, whether a reduction of the fuel and thus of the power is possible without the proportion of nitrogen oxides exceeding the target value. In parallel with this, it is determined in the control device, on the basis of the calculation model, how far the quantity of fuel can be reduced until the proportion of carbon monoxide theoretically reaches the target value. Owing to the lack of knowledge about the actual content in the exhaust air, a greater tolerance with respect to the permissible limit value must be observed here.

Similarly, in a second method according to the invention, the actual proportion of carbon monoxide in the exhaust air is continuously measured. On the basis of the known actual proportion of carbon monoxide, the possible reduction of the fuel or of the power before the target value for the proportion of carbon monoxide is reached is then calculated in the control device on the basis of the calculation model. Conversely to the first method, it is determined in parallel whether a reduction of the fuel is possible without the calculated proportion of nitrogen oxides exceeding the target value.

Subsequently, the fuel supply is then reduced, while continuing to monitor the actual proportion of nitrogen oxides (in the first method) or of carbon monoxide (in the second method), until the calculated minimum fuel quantity is reached. If the measured actual proportion of nitrogen oxides or carbon monoxide reaches the target value even before this, the reduction of the fuel supply is then stopped already at that point. The result in both methods is an assumed minimum fuel supply and thus minimum power at which one of the two or both pollutants, nitrogen oxides or carbon monoxide, has reached the target value. It can be reliably assumed here that both permissible limit values are complied with.

A third method according to the invention combines the first method with the second method, wherein the exhaust air measurement device can monitor both the actual proportion of nitrogen oxides and the actual proportion of carbon monoxide. Just as in the other methods, in the case of the signal that a minimum power is to be approached, the control device uses the calculation model to calculate how far the fuel or the power can be reduced before one of the two or both target values is reached. Since both values are continuously detected, the selected tolerance with respect to the permissible limit value can be relatively small for both pollutants.

As before, the fuel supply or the power is reduced until the previously calculated minimum fuel supply is reached. If, during this process, the state arises in which one of the two measured values for the actual proportion of nitrogen oxides or of carbon monoxide reaches the target value, the fuel reduction is stopped.

In the simplest case, the calculation of the lowest possible fuel supply is carried out once after the signal for ramping down the combustion device to a minimum power has been given. However, it is particularly advantageous if subsequently—as long as the minimum power is desired—the calculation is carried out repeatedly, making it possible—where available—to exploit a new opportunity for further lowering the fuel supply or the power. Accordingly, when recalculating on the basis of the given target values for the pollutants and the measured proportion of nitrogen oxides or of carbon monoxide, the minimum fuel supply at which the target values are not exceeded is recalculated.

If, on the basis of the current measurement or on the basis of a recalculation, it is found that the permissible limit values are exceeded, the fuel supply is increased. If, on the other hand, it is found on the basis of a recalculation that both target values are undershot, a renewed reduction of the fuel supply can take place.

On the one hand, recalculation can be provided at regular intervals. For example, the period of time can be selected in such a way that, after a change in the fuel supply and thus in the power, the proportion of pollutants, which changes as a result, has leveled off to a substantially constant value.

On the other hand, continuous measurement of the nitrogen oxides and/or of the carbon monoxide can lead to recalculation. For example, continuous matching can be carried out between the measured values and the permissible limit values and/or the target value, wherein, when a specified absolute or relative difference is reached, a recalculation is initiated to adapt the fuel quantity. In this case, provision can be made for the selected difference to be small if the target value is exceeded and, in contrast, for the selected difference to be greater if the target value is undershot.

A greater potential for reducing the fuel quantity is made possible if the combustion device comprises at least one main burner and at least one secondary burner. What kind of burner is involved here is irrelevant in the first instance, it being envisaged that these have a different combustion characteristic. Analogously to the use of a single burner or of a single burner type, it is necessary for the main burner and the secondary burner to be able to deliver fuel and/or supply air into the combustion chamber.

If a main burner and a secondary burner are present, it is possible to extend the calculation model to the effect that a distribution of the fuel between the main burner and the secondary burner is calculated. Thus, for a given fuel quantity and the distribution of the fuel, the expected proportion of carbon monoxide and the expected proportion of nitrogen oxides can be calculated. In matching with the target values for nitrogen oxides or carbon monoxide, it is possible below, as before, to determine a minimum fuel supply at which at least an actual proportion of nitrogen oxides or of carbon monoxide reaches the target value with a given distribution of the fuel. Correspondingly, as before, the fuel supply can be reduced as far as the calculated minimum fuel supply.

However, it is particularly advantageous if an optimum distribution of the fuel is calculated when a main burner and a secondary burner are used. For this purpose, matching can be carried out iteratively between the calculated values for the proportion of nitrogen oxides and carbon monoxide and the target values when changing the distribution of the fuel and reducing the fuel quantity until the smallest possible difference between the calculated proportion for the pollutants and the target values is achieved.

This method is suitable in a particularly advantageous way if the secondary burner is a "pilot burner".

In this method for determining an advantageous distribution of the fuel, it is advantageous if account is taken of the pollutant for which the difference between the actually measured value or the theoretically calculated proportion and the target value is greater.

If, in the first case, the difference between the proportion of carbon monoxide and the associated target value is greater than the difference between the proportion of nitrogen oxides and the associated target value, it is advantageous if the distribution of the fuel is changed to the effect that the proportion for the main burner is increased and the proportion for the secondary burner is reduced.

Conversely, it is advantageous in the second case, if the difference between the proportion of nitrogen oxides and the associated target value is greater than the difference between the proportion of carbon monoxide and the associated target value, it is advantageous if the distribution of the fuel is changed to the effect that the proportion for the secondary burner is increased and the proportion for the main burner is reduced.

If, after calculation of an optimum distribution of the fuel quantity between the main burner and the secondary burner, undershooting of both target values is calculated or if, after the setting of a corresponding fuel quantity, undershooting is determined on the basis of the measurement of the pollutants, the fuel supply can subsequently be further reduced.

A further improvement of the method, in particular for the purpose of reducing necessary tolerances, is achieved if a supply air measurement device, by means of which at least one property of the supply air can be determined, is provided. It is particularly advantageous here if the temperature and the air humidity of the supply air are known in the calculation model. Accordingly, these values can be taken into account in the calculation of the minimum fuel quantity and the optimum distribution of the fuel.

In principle, it is sufficient in the first instance if the calculation model is created using the known bases of calculation (e.g. combustion characteristic, properties of the combustion device, type of fuel), wherein the measured actual proportion of pollutants represents the variable for calculation.

Owing to the complexity of a combustion process and the possible change in the combustion characteristic, for example on account of different local ambient conditions, it is furthermore advantageous if adaptation of the calculation model is possible. To this end, it is advantageous if the calculation parameters are continuously stored together with as many available state data as possible. The state data include the actual states of the combustion device or gas turbine (temperature data, vibration data, etc.), the type and/or quality of the fuel, the temperature and/or air humidity of the supply air, the actual proportion of nitrogen oxides and/or carbon monoxide in the exhaust air. Taking into account the stored data, adaptation of the calculation model can be performed at regular intervals or continuously. In this case, the methods of "self-learning" can be used in a particularly advantageous manner.

In general, this method is not restricted to one type of fuel. If a main burner and a secondary burner are present, provision can also be made for the use of different fuels. In principle, the method can advantageously be used when the fuel is gaseous.

BRIEF DESCRIPTION OF THE DRAWINGS

A combustion device and a time sequence are outlined schematically in the following figures. More specifically.

DETAILED DESCRIPTION OF INVENTION

Figure 1:
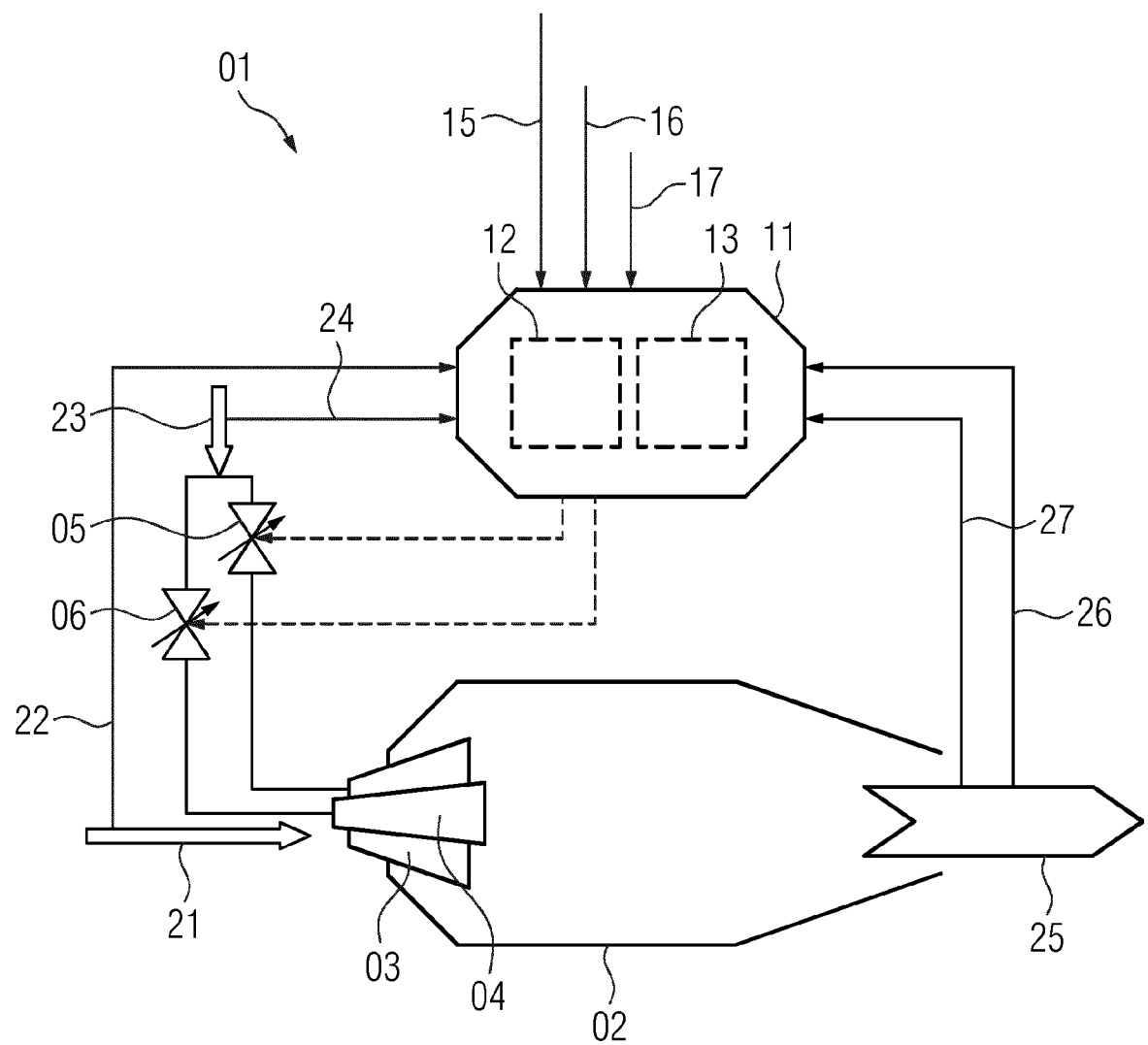
FIG. 1 shows a schematic illustration of a combustion device according to the invention.

FIG. 1 schematically outlines a combustion device 01 according to the invention. First of all, this comprises the combustion chamber 02 with the main burner 03 arranged thereon and the secondary burner 04. Fuel 23 and supply air 21 can be fed to the burners 03, 04. Exhaust air 25, i.e. flue gas, emerges from the combustion chamber 02.

To control the method, there is a control device 11, in which a calculation model 12 is stored and which, in this exemplary embodiment, comprises a data memory 13. Various characteristic quantities are transmitted to the control device 11. On the one hand, the maximum proportion of nitrogen oxides 16 and the maximum proportion of carbon monoxide 17 are specified as fixed values. These may be the respectively permissible limit value or the target value. In the first case, the target value can be calculated by the control device. It is likewise possible to transmit both the permissible limit value and the respective target value to the control device 11 as stipulated values.

It is furthermore necessary for the type or quality 24 of the fuel 23 to be known in the calculation model. For this purpose, provision is made, by way of example, for this type or quality 24 to be continuously detected and transmitted to the control device 11. Provision is furthermore made in this exemplary embodiment for the temperature and the air humidity 22 of the supply air 21 to be measured and transmitted to the control device 11.

It is furthermore essential for the method according to the invention that the actual proportion of nitrogen oxides 26 and/or the actual proportion of carbon monoxide 27 in the exhaust air 25 be continuously measured and transmitted to the control device 11.

The method according to the invention is triggered by a signal for running up to a minimum power, for which purpose the respectively required setpoint power 15 is transmitted to the control device 11.

When the method is carried out in the control device 11 on the basis of the calculation model 12 stored there, the minimum fuel supply and, at the same time, the optimum distribution between the main burner 03 and the secondary burner 04 are calculated. On the basis of the calculation result, a correspondingly associated main valve 05 for controlling the fuel flow to the main burner 03 and a correspondingly associated secondary valve 06 for controlling the fuel flow to the secondary burner 04 are actuated by the control device 11.

Figure 2:
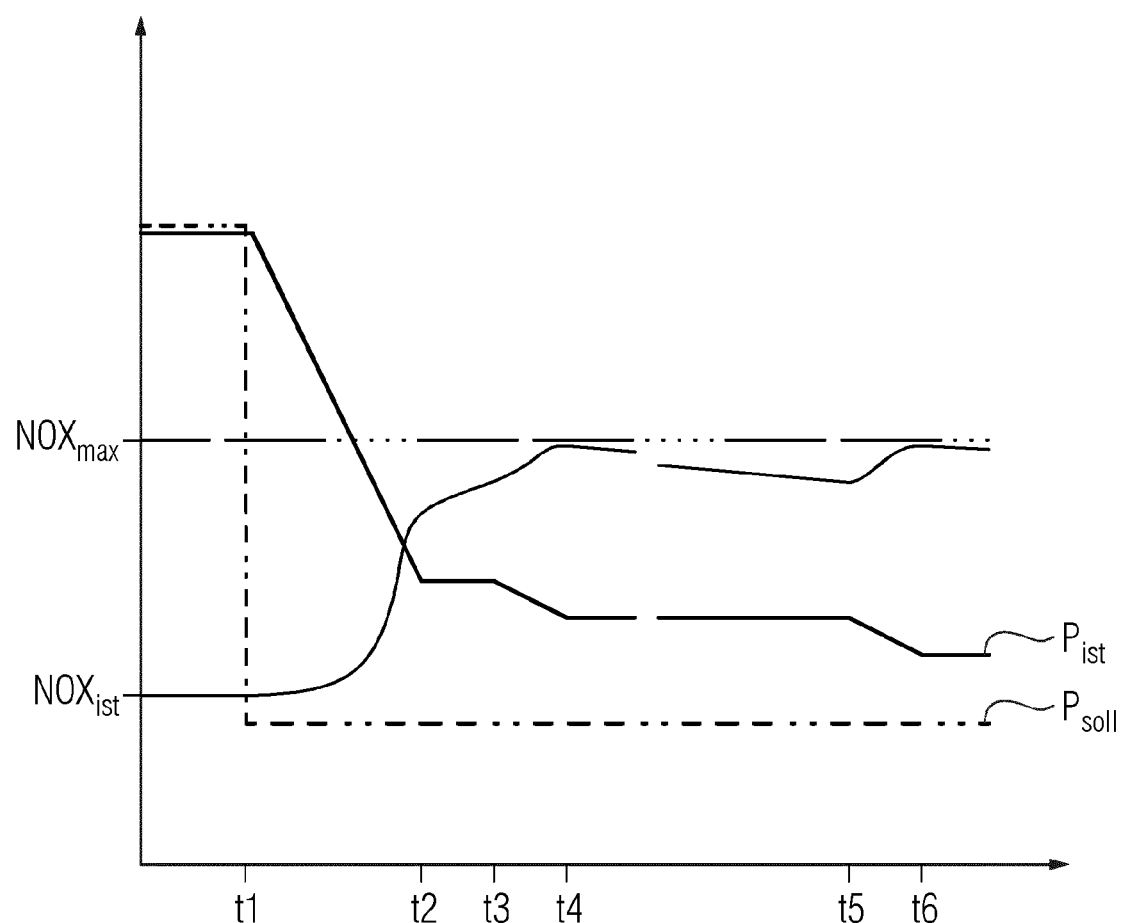
FIG. 2 shows a schematic illustration of one possible profile of parameters over time when using the method according to the invention.

FIG. 2 illustrates, by way of example a possible method sequence with various characteristic quantities over time. Starting from a normal power of the combustion device, the signal to run up to a minimum power $P_{soll}$ was output at time T1. A minimum power or minimum fuel supply at which the specified limit values for the proportion of nitrogen oxides and the proportion of carbon monoxide are maintained (i.e. at least one target value is reached) is then calculated in the control device 11 on the basis of the calculation model 12. In this case, the target value $NOx_{max}$ is specified in the control device. In accordance with the calculation, the fuel supply and thus the power $P_{ist}$ is now reduced. As a rule, the reduction in the power is accompanied by an increase in the proportion of pollutants, i.e. in this case the proportion of nitrogen oxides $NOx_{ist}$, and the proportion of carbon monoxide (not illustrated here)—see time T2. Thus, the reducing the fuel supply is performed over a first time period (e.g., from T1 to T2 in FIG. 2) such that a difference between the target value $NOX_{max}$ for nitrogen oxides and the actual proportion $NOX_{ist}$ for nitrogen oxides is reduced from a first value to a second value over the first time period (e.g., from T1 to T2 in FIG. 2).

Now, it may be, for example, that the target value for carbon monoxide has already been reached in the calculation, whereas there is still a relatively large difference between the target value for nitrogen oxides and the measured value $NOx_{ist}$. This leads to the advantageous method of changing the fuel distribution, such that there is also a difference between the target value for carbon monoxide and the calculated value, this being accompanied by a reduction of the difference between the target value for nitrogen oxides and the measured value $NOx_{ist}$—see time T3. Here, a renewed reduction of the fuel quantity can be performed until the target values $NOx_{max}$ corresponding to the calculation or the respective measurement are substantially reached—see time T4. Thus, the reducing the fuel supply is also performed over a first time period (e.g., from T3 to T4 in FIG. 2) such that a difference between the target value $NOX_{max}$ for nitrogen oxides and the actual proportion $NOX_{ist}$ for nitrogen oxides is reduced until the target value $NOX_{max}$ is substantially reached (e.g., from T3 to T4 in FIG. 2).

Now, there may be a stabilization of the process, over a second time period (e.g. from T4 to T5 in FIG. 2) in which the proportion of pollutants decreases in the course of time and thus the difference between the target value $NOX_{max}$ and actual proportion $NOX_{ist}$ increases over the second time period (e.g—see time T4 to time T5 in FIG. 2). As shown in FIG. 2, the power $P_{ist}$ (and thus the fuel supply) is held fixed over the second time period (e.g. from T4 to T5 in FIG. 2). By virtue of the continuous monitoring of at least one pollutant, it is possible to trigger a new calculation if a difference arises, thus allowing renewed lowering of the fuel supply over a third time period (e.g. from T5 to T6 in FIG. 2) and thus of the power $P_{ist}$—see time T6. Consequently, as shown in FIG. 2, the difference between the target value NOXmax and the actual proportion NOXist is reduced over the third time period (e.g. from T5 to T6 in FIG. 2).

The invention claimed is:

1. A method for controlling a combustion process in a combustion device, comprising a combustion chamber, in which fuel is burnt with supply air, and at least one burner, which delivers the fuel and/or the supply air into the combustion chamber, and a control device, in which a calculation model of the combustion process is stored, and an exhaust air measurement device, which detects the actual proportion of nitrogen oxides and the actual proportion of carbon monoxide; the method comprising:
   setting a permissible limit value for the proportion of nitrogen oxides and determining a first target value based on the permissible limit value for the proportion of nitrogen oxides minus a tolerance;
   setting a permissible limit value for the proportion of carbon monoxide and determining a second target value based on the permissible limit value for the proportion of carbon monoxide minus a tolerance;
   continuously detecting the actual proportion of nitrogen oxides and the actual proportion of carbon monoxide in the exhaust air;
   acquiring a signal for setting a minimum power;
   calculating a minimum total fuel supply, using the calculation model, at which the expected proportion of carbon monoxide and the expected proportion of nitrogen oxides, respectively, reach the respective first and second target values;
   while continuously monitoring the actual proportion of nitrogen oxides and the actual proportion of carbon monoxide in the exhaust air, reducing the fuel supply as far as the calculated minimum fuel supply or until the respective first and second target values for nitrogen oxides and carbon monoxide is reached, to ensure that the respective first and second target values for nitrogen oxides and carbon monoxide are complied with when the fuel supply is reduced; and
   wherein the calculation is carried out repeatedly, wherein the fuel supply is increased when exceeding of one of the permissible limit values is detected, and the fuel supply is further reduced when undershooting of both the first and second target values is detected.

2. The method as claimed in claim 1,
wherein the calculation is carried out at regular intervals; or
wherein the calculation is carried out as soon as a specified difference between the measured actual proportion of a pollutant in the exhaust air and the target value given therefor is exceeded.

3. The method as claimed in claim 1,
wherein the combustion device comprises at least one main burner and at least one secondary burner, which each delivers fuel and/or supply air into the combustion chamber; further comprising:
when calculating the minimum fuel supply, determining a distribution of the fuel between the main burner and the secondary burner at which the expected proportion of carbon monoxide and the expected proportion of nitrogen oxides, respectively, reach the respective second and first target values;
reducing the fuel supply, taking into account the previously calculated distribution of the fuel between the main burner and the secondary burner.

4. The method as claimed in claim 3,
wherein the secondary burner is a pilot burner.

5. The method as claimed in claim 3,
wherein, when there is a relatively large difference between the second target value and the calculated or measured actual proportion of carbon monoxide and a relatively small difference between the first target value and the calculated or measured actual proportion of nitrogen oxides, the distribution of the fuel is changed, with a higher proportion for the main burner and a smaller proportion for the secondary burner;
wherein the fuel supply is subsequently further reduced when undershooting of both the first and second target values is detected.

6. The method as claimed in claim 3,
wherein, when there is a relatively large difference between the first target value and the calculated or measured actual proportion of nitrogen oxides and a relatively small difference between the second target value and the calculated or measured actual proportion of carbon monoxide, the distribution of the fuel is changed, with a higher proportion for the secondary burner and a smaller proportion for the main burner;
wherein the fuel supply is subsequently further reduced when undershooting of both the first and second target values is detected.

7. The method as claimed in claim 1,
wherein a supply air measurement device determines at least one property of the supply air, wherein the property is taken into account in the control device when calculating the fuel supply and/or distribution of the fuel.

8. The method as claimed in claim 1,
wherein the calculation parameters and available state data, comprising one or more of actual states of the combustion device and/or the type and/or quality of the fuel and/or the temperature and/or air humidity of the supply air and/or the actual proportion of nitrogen oxides and/or carbon monoxide in the exhaust air, are/is continuously stored, and regular or continuous adaptation of the calculation model is carried out on the basis of the stored data.

9. The method as claimed in claim 1, wherein the fuel is gaseous.

10. The method as claimed in claim 1, wherein the combustion device comprises a gas turbine.

11. The method as claimed in claim 7, wherein the at least one property of the supply air comprises temperature and/or air humidity.

12. The method as claimed in claim 8, wherein the regular or continuous adaptation of the calculation model is carried out on the basis of the stored data by methods of self-learning.

13. The method as claimed in claim 1, wherein the reducing the fuel supply is performed over a first time period such that a difference between the first target value for nitrogen oxides and the actual proportion for nitrogen oxides is reduced from a first value to a second value;
wherein the actual proportion for nitrogen oxides decreases over a second time period such that the difference increases from the second value to a third value; and
wherein the fuel supply is further reduced over a third time period such that the difference is reduced from the third value to a fourth value.

14. The method as claimed in claim 13, wherein the fuel supply is fixed during the second time period.

15. The method as claimed in claim 14, wherein the fuel supply is reduced from a first value to a second value over the first time period and is further reduced from the second value to a third value over the third time period and wherein the fuel supply is fixed at the second value during the second time period.

16. A method for controlling a combustion process in a combustion device, comprising a combustion chamber, in which fuel is burnt with supply air, and at least one burner, which delivers the fuel and/or the supply air into the combustion chamber, and a control device, in which a calculation model of the combustion process is stored, and an exhaust air measurement device, which detects the actual proportion of nitrogen oxides and the actual proportion of carbon monoxide; the method comprising:
setting a permissible limit value for the proportion of nitrogen oxides and determining a first target value based on the permissible limit value for the proportion of nitrogen oxides minus a tolerance;
setting a permissible limit value for the proportion of carbon monoxide and determining a second target value based on the permissible limit value for the proportion of carbon monoxide minus a tolerance;
continuously detecting the actual proportion of nitrogen oxides and the actual proportion of carbon monoxide in the exhaust air;
acquiring a signal for setting a minimum power;
calculating a minimum total fuel supply, using the calculation model, at which the expected proportion of carbon monoxide and the expected proportion of nitrogen oxides, respectively, reach the respective first and second target values;
while continuously monitoring the actual proportion of nitrogen oxides and the actual proportion of carbon monoxide in the exhaust air, reducing the fuel supply as far as the calculated minimum fuel supply or until the respective first and second target values for nitrogen oxides and carbon monoxide is reached, to ensure that the respective first and second target values for nitrogen oxides and carbon monoxide are complied with when the fuel supply is reduced;
wherein the combustion device comprises at least one main burner and at least one secondary burner, which each delivers fuel and/or supply air into the combustion chamber; wherein the method further comprises:
when calculating the minimum fuel supply, determining a distribution of the fuel between the main burner and the secondary burner at which the expected proportion of carbon monoxide and the expected proportion of nitrogen oxides, respectively, reach the respective second and first target values;
reducing the fuel supply, taking into account the previously calculated distribution of the fuel between the main burner and the secondary burner.

17. The method as claimed in claim 16, wherein the reducing the fuel supply is performed over a first time period such that a difference between the first target value for nitrogen oxides and the actual proportion for nitrogen oxides is reduced from a first value to a second value;
wherein the actual proportion for nitrogen oxides decreases over a second time period such that the difference increases from the second value to a third value; and
wherein the fuel supply is further reduced over a third time period such that the difference is reduced from the third value to a fourth value.

18. The method as claimed in claim 17, wherein the fuel supply is fixed during the second time period.

19. The method as claimed in claim 16, wherein the fuel supply is reduced from a first value to a second value over the first time period and is further reduced from the second value to a third value over the third time period and wherein the fuel supply is fixed at the second value during the second time period.

* * * * *